(12) United States Patent
McClintock et al.

(10) Patent No.: US 9,251,375 B1
(45) Date of Patent: Feb. 2, 2016

(54) USE CASE-SPECIFIC ENTITY IDENTIFIERS

(71) Applicant: Amazon Technologies, Inc., Reno, NV (US)

(72) Inventors: Jon Arron McClintock, Seattle, WA (US); Darren Ernest Canavor, Redmond, WA (US); Daniel Wade Hitchcock, Bothell, WA (US); Jesper Mikael Johansson, Redmond, WA (US); Bharath Kumar Bhimanaik, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 159 days.

(21) Appl. No.: 14/019,120

(22) Filed: Sep. 5, 2013

(51) Int. Cl.
G06F 11/30 (2006.01)
G06F 21/64 (2013.01)

(52) U.S. Cl.
CPC ...................................... *G06F 21/64* (2013.01)

(58) Field of Classification Search
CPC . G06F 21/72; G06F 21/10; G06F 2221/2107; H04L 9/08; H04L 63/0428
USPC .......................................................... 713/189
See application file for complete search history.

(56) References Cited

U.S. PATENT DOCUMENTS

| 7,600,253 B1 * | 10/2009 | Wang .............................. 726/10 |
| 2007/0250904 A1 * | 10/2007 | Waller ............................. 726/1 |
| 2007/0260875 A1 | 11/2007 | Raghunath et al. |
| 2010/0042833 A1 | 2/2010 | Platt |

OTHER PUBLICATIONS

U.S. Appl. No. 13/561,686 entitled "Automatic Application Dependent Anonymization" filed Jun. 30, 2012.
U.S. Appl. No. 14/019,124 entitled "Centrally Managed Use Case-Specific Entity Identifiers" filed Sep. 5, 2013.

* cited by examiner

Primary Examiner — Baotran N To
(74) Attorney, Agent, or Firm — Thomas | Horstemeyer, LLP

(57) ABSTRACT

Use case-specific entity identifiers are disclosed. Entity data associated with an actual entity identifier of an entity is generated. A use case-specific entity identifier is generated based at least in part on encrypting the actual entity identifier using reversible encryption. The entity data, in association with the use case-specific entity identifier, is sent to another service.

20 Claims, 10 Drawing Sheets

USE CASE-SPECIFIC ENTITY IDENTIFIERS

BACKGROUND

The collection and use of sensitive information deserves heightened protection. In some cases, third-party services can gain access to private user information. Such uncontrolled access to private sensitive information could result in serious security risks, including online identity abuse.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing use case-specific entity identifiers. An enterprise or other organization may assign their customers unique identifiers. The unique identifiers may be important for purposes of record keeping and to associate data of various forms with the customer. Additionally, unique identifiers may provide a form of anonymization. Rather than using personally identifiable information (e.g., full name, Social Security numbers, telephone numbers, etc.), a randomized number or string may be generated and assigned as a unique identifier. Thus, if a malicious user were to gain access to a customer-associated data item, the malicious user would not know the identity of the customer merely from the unique identifier.

In one scenario, an organization may assign a single unique identifier to each customer and then associate all data pertaining to the customer with the single unique identifier. However, this presents a security risk. If a malicious user were to gain access to different types of data associated with the same unique identifier, the malicious user may learn information about the corresponding customer that may constitute an invasion of privacy. Further, in some cases, the malicious user may be able to correlate the unique identifier with personally identifiable information within the different types of data.

Various embodiments of the present disclosure protect entity identifiers by creating use case-specific, or application-specific, entity identifiers. As used herein, the term "entity" may refer to a customer or customer account, a user or user account, an organization or organizational account, and so on. In some situations, a service may be associated with a single use case, thereby making the use case-specific entity identifier a service-specific entity identifier.

For example, the data pertaining to a particular service may be associated with use case-specific entity identifiers that are generated from the actual entity identifiers. Nonetheless, it may be important to facilitate correlation among the use case-specific entity identifiers on an authorized basis. For example, an application may need to correlate product purchase entity identifiers with page view entity identifiers. To this end, a use case-specific entity identifier may comprise an encrypted version of the actual entity identifier, where different encryption keys are employed for different services. A central broker may provide corresponding decryption keys to an application or service on an authorized basis. In some embodiments, the use case-specific entity identifiers may be centrally managed by an identifier translation service such that the other services need not be aware of the actual entity identifiers or perform identifier conversion functions.

Figure 1:
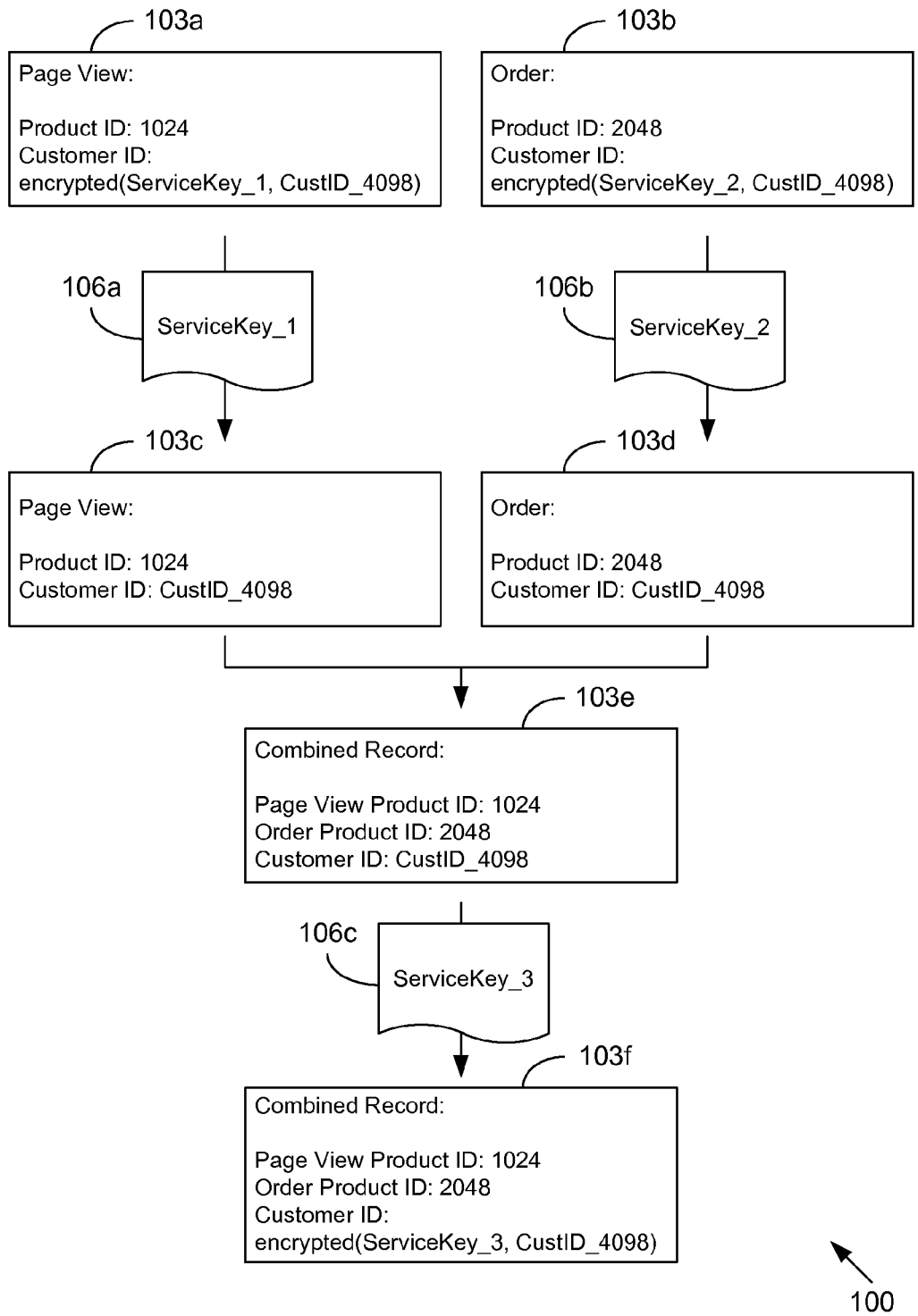
FIG. 1 is a drawing illustrating one example scenario using use case-specific entity identifiers according to an embodiment of the present disclosure.

With reference to FIG. 1, shown is a drawing illustrating one example scenario 100 using use case-specific entity identifiers according to an embodiment of the present disclosure. In the example scenario, suppose that an organization has three services: A, B, and C. Service A generates page view data for product detail pages. Service B generates order data for product orders. Finally, Service C consumes data produced by Services A and B and performs processing and/or analysis on the data, thereby generating data as a result. Each of the services employs use case-specific entity identifiers.

In this example, Service A has generated data record 103a, regarding a page view of a product having a product identifier of "1024" and a use case-specific entity identifier of "encrypted(ServiceKey_1, CustID_4098)." In other words, the actual entity identifier of "CustID_4098" has been encrypted with a key pertaining to Service A. Additionally, Service B has generated data record 103b, regarding an order of a product having a product identifier of "2048" and a use case-specific entity identifier of "encrypted(ServiceKey_2, CustID_4098)." In other words, the actual entity identifier of "CustID_4098" has been encrypted with a key pertaining to Service B. Consequently, the data records 103a and 103b cannot be correlated based upon the use case-specific entity identifiers, which differ. For purposes of understandability, the use case-specific entity identifiers have been denoted in FIG. 1 as corresponding to exemplary function calls that produce the respective use case-specific entity identifiers. In practice, such use case-specific entity identifiers may correspond to strings of random characters or random binary data.

Suppose that data records 103a and 103b are made available to Service C, along with use case-specific keys 106a ("ServiceKey_1") and 106b ("ServiceKey_2"). By contrast, it may be the case that Service A is not provided with the use case-specific key 106b of Service B and that Service B is not provided with the use case-specific key 106a of Service A. Having the appropriate use case-specific keys 106a and 106b, Service C is then able to decrypt the respective use case-specific entity identifiers of the data records 103a and 103b, thereby producing data records 103c and 103d. In data records 103c and 103d, the corresponding entity identifier fields have been decrypted from "encrypted(ServiceKey_1, CustID_4098)" and "encrypted(ServiceKey_2, CustID_4098)" to be "CustID_4098," which is the actual entity identifier for the customer. Accordingly, Service C is able to correlate data record 103c with data record 103d, given the common actual entity identifier of "CustID_4098."

Service C may then produce a data record 103e as output, which may encompass data from both Service A and Service B. In this example, the data record 103e links products viewed and products purchased to a customer. Before making the data available to other services, Service C may obtain its own use case-specific key 106c and encrypt the actual entity identifier, thereby producing a data record 103f. In the data record 103f, the entity identifier field corresponds to "encrypted(ServiceKey_3, CustID_4098)." In an alternative scenario, Service C may first convert the use case-specific entity identifiers of data records 103a and 103b to "encrypted(ServiceKey_3, CustID_4098)" and then perform correlation based upon the newly matching use case-specific entity identifier.

The data record 103f may be used for a "Customers Who Viewed Product X Purchased Product Y" feature to suggest products to customers. A Service D that generates such a feature may have no need to know the actual customer behind the data record 103f. Accordingly, Service D may be restricted from accessing the use case-specific key 106c.

Although the term "customer" is used herein, it is not intended to be limiting. In this regard, a customer may correspond to one or more users or individuals who may or may not have purchased or leased products or services from the organization. Another organization may also correspond to a customer. Further, a unified system of customer identification may be shared among multiple organizations. Thus, references to an "organization" may be understood as encompassing multiple organizations which coordinate shared use of a unified system of customer identification. Although the term "service" is employed here, it is understood that the principles of the present disclosure may apply to applications, modules, use cases, and/or any other logic that is capable of employing independent namespaces for entity identifiers.

Various techniques relevant to application-specific anonymization are disclosed in U.S. patent application Ser. No. 13/561,686 entitled "AUTOMATIC APPLICATION DEPENDENT ANONYMIZATION" and filed on Jun. 30, 2012, which is incorporated herein by reference in its entirety. In the following discussion, a general description of the present system and its components is provided, followed by a discussion of the operation of the same.

Figure 2A:
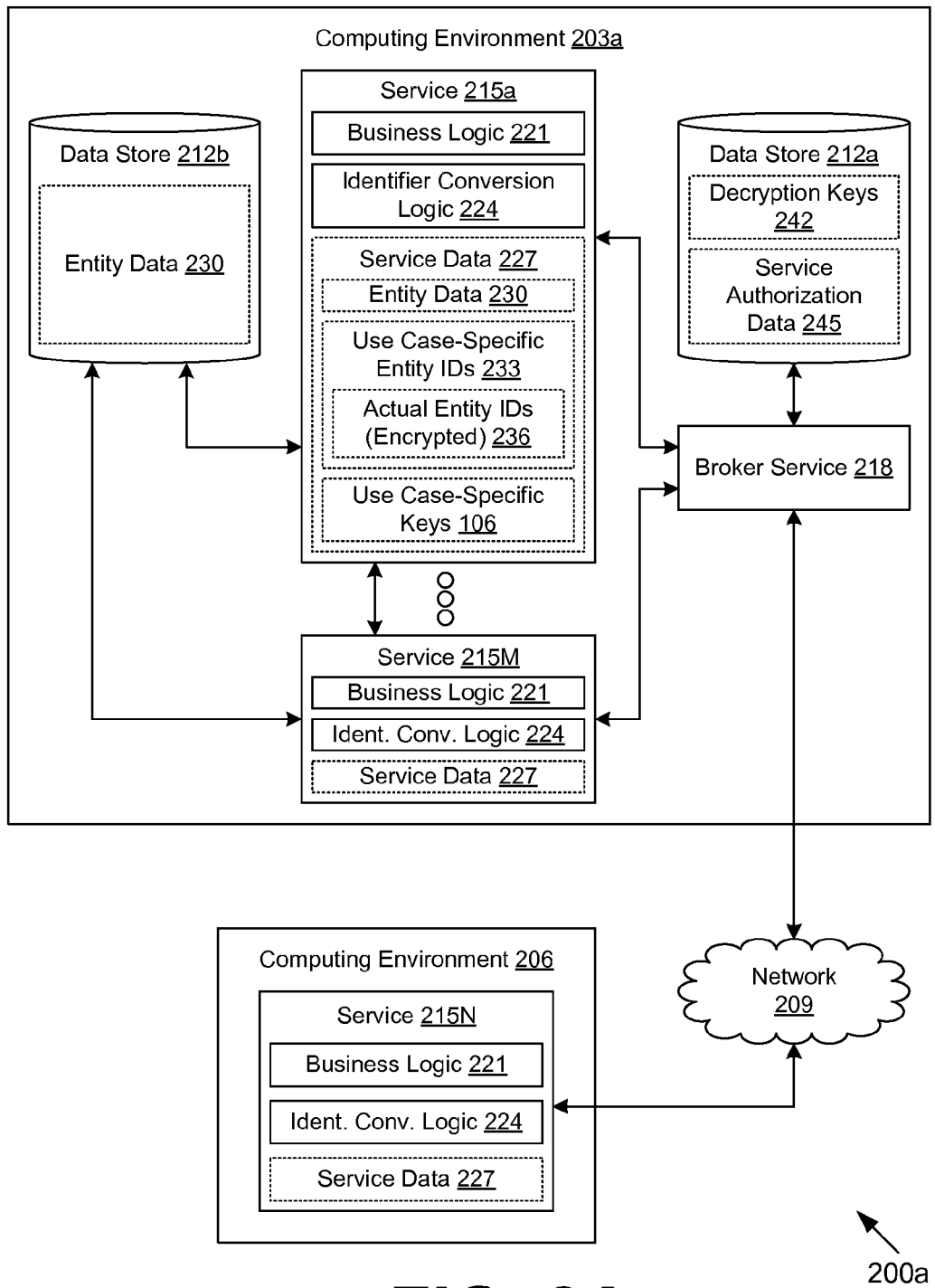
FIG. 2A is a drawing of a networked environment according to various embodiments of the present disclosure.

With reference to FIG. 2A, shown is a networked environment 200a according to various embodiments. The networked environment 200a includes a computing environment 203a and a computing environment 206, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 203a may comprise, for example, a server computer or any other system providing computing capability. Alternatively, the computing environment 203a may employ a plurality of computing devices that may be arranged, for example, in one or more server banks or computer banks or other arrangements. Such computing devices may be located in a single installation or may be distributed among many different geographical locations. For example, the computing environment 203a may include a plurality of computing devices that together may comprise a hosted computing resource, a grid computing resource and/or any other distributed computing arrangement. In some cases, the computing environment 203a may correspond to an elastic computing resource where the allotted capacity of processing, network, storage, or other computing-related resources may vary over time.

Various applications and/or other functionality may be executed in the computing environment 203a according to various embodiments. Also, various data is stored in data stores 212a, 212b that are accessible to the computing environment 203a. Each of the data stores 212 may be representative of a plurality of data stores 212 as can be appreciated. The data stored in the data stores 212, for example, is associated with the operation of the various applications and/or functional entities described below.

The components executed on the computing environment 203a, for example, include a plurality of services 215a . . . 215M, a broker service 218, and other applications, services, processes, systems, engines, or functionality not discussed in detail herein. The services 215 and the broker service 218 may be in data communication via inter-process communication, remote method invocation, remote procedure call, simple object access protocol (SOAP), representational state transfer (REST), and/or other communication application programming interfaces (APIs). Each of the services 215 is executed to perform a business function relating to the organization operating the computing environment 203a. To this end, each of the services 215 may respectively include business logic 221, identifier conversion logic 224, service data 227, and/or other components. The service data 227 may include entity data 230, use case-specific entity identifiers (IDs) 233 that incorporate encrypted versions of actual entity identifiers 236, use case-specific keys 106, and/or other data.

The business logic 221 performs one or more business functions, which may involve obtaining, generating, transforming, storing, and/or performing other operations on entity data 230. For example, for an organization that operates an electronic commerce system, the business logic 221 may perform network page component generation functions, data logging functions, order management functions, order fulfillment functions, shopping cart management functions, customer product review management functions, catalog management functions, and/or other functions.

The identifier conversion logic 224 is executed to convert use case-specific entity identifiers 233 that are specific to another service 215. To this end, the identifier conversion logic 224 may obtain a decryption key 242 from the broker service 218 in order to decrypt the actual entity identifier 236 in the use case-specific entity identifier 233. The identifier conversion logic 224 may then convert the actual entity identifier 236 to another use case-specific entity identifier 233 that is specific to the present service 215. Some services 215 may be configured to operate upon only the use case-specific entity identifiers 233, and therefore may exclude the identifier conversion logic 224 and/or the use case-specific keys 106. Thus, some services 215 may be restricted from accessing the actual entity identifiers 236.

The entity data 230 may include data records that are associated with customers of the organization or other entities. In particular, each data record may be associated with a corresponding use case-specific entity identifier 233 to identify the corresponding customer. The use case-specific entity identifier 233 comprises an encrypted version of an actual entity identifier 236 that has been encrypted using a use case-specific key 106 and a form of reversible encryption. The actual entity identifier 236 may comprise a number, a character string, binary data, or any other form of unique identifier. The use case-specific entity identifier 233 may also include a unique identifier of the use case-specific key 106 or of the service 215 pertaining to the use case-specific key 106.

The actual entity identifiers 236 and use case-specific entity identifiers 233 for the different use cases may share a unified namespace. In other words, the actual entity identifiers 236 and use case-specific entity identifiers 233 for the different use cases may be unique with respect to each other. Uniqueness may be enforced, for example, by incorporating a use case identifier. For example, a unique identifier for a use case may be prepended to the use case-specific entity identifiers 233 for that use case to ensure uniqueness across the use cases. In other embodiments, the actual entity identifiers 236 and use case-specific entity identifiers 233 for the different use cases may each be associated with distinct corresponding namespaces that are distinguished by context of usage. For example, if a first service 215 obtains entity data 230 from a second service 215 associated with a specific use case, the first service 215 may assume that the associated use case-specific entity identifiers 233 correspond to the namespace of the second service 215.

An example format for a use case-specific entity identifier 233 will next be discussed. For example, a use case-specific entity identifier 233 may include a flag that indicates whether the use case-specific entity identifier 233 is a canonical identifier, a length value, a namespace indicator, a key identifier corresponding to a use case-specific key 106 used to generate the use case-specific entity identifier 233, the encrypted version of the corresponding actual entity identifier 236, a checksum value, an expiration time value, and/or other data. The namespace indicator may indicate, for example, a specific namespace or the specific use case to which the use case-specific entity identifier 233 pertains. The use case-specific entity identifier 233 may correspond to a numerical value with a bit mask to decode the specific fields therein. Alternatively, the use case-specific entity identifier 233 may correspond to an extensible markup language (XML) document, JavaScript object notation (JSON)-formatted data, and/or other data.

The use case-specific keys 106 may correspond to public/private asymmetric key pairs or symmetric keys. Where the use case-specific key 106 is a symmetric key, the same use case-specific key 106 used to encrypt the actual entity identifier 236 may be used to decrypt the actual entity identifier 236. Where the use case-specific key 106 corresponds to a public/private key pair, the public key is used to encrypt the actual entity identifier 236, and the private key is used to decrypt the actual entity identifier 236. It is noted that a given service 215 or use case may employ multiple use case-specific keys 106. For example, a given service 215 may employ a different use case-specific key 106 for each grouping of one or more entities, e.g., groupings of one-hundred entities. Further, different use case-specific keys 106 may be employed based upon the current time, e.g., a different use case-specific key 106 is employed every thirty minutes.

In one embodiment, one of multiple use case-specific keys 106 for a use case may be selected at random to encrypt the actual entity identifier 236. In one embodiment, the same one of the multiple use case-specific keys 106 for a single use case will be selected for a particular actual entity identifier 236. In another embodiment, different ones of the multiple use case-specific keys 106 for the single use case may be selected for the particular actual entity identifier 236.

The broker service 218 is executed to provide decryption keys 242 to services 215 upon request. For example, a first service 215 may need to convert use case-specific entity identifiers 233 generated by a second service 215. The first service 215 then may request the appropriate decryption key 242 from the broker service 218. The broker service 218 may authenticate the first service 215 and then determine whether the first service 215 should have access to the requested decryption key 242. If the first service 215 is authorized to access the decryption key 242, the broker service 218 then provides the decryption key 242 to the first service 215 via, for example, an encrypted channel of communication. Although one broker service 218 is depicted in FIG. 2A, it is understood that multiple broker services 218 may be employed. For example, one broker service 218 may be utilized by a first set of services 215, and another broker service 218 may be utilized by a second set of services 215.

The data stored in the data store 212a includes, for example, decryption keys 242, service authorization data 245, and potentially other data. In one embodiment, access to the data store 212a may be restricted to the broker service 218. In some embodiments, the data store 212a may also store the some or all of the service data 227 for the services 215. In such embodiments, access to the service data 227 may be restricted, e.g., so that a service 215 can access only its own service data 227 or other service data 227 to which it has been granted access.

The decryption keys 242 correspond to the decryption components of the use case-specific keys 106. Where the use case-specific keys 106 are symmetric keys, the decryption keys 242 may be the same as the use case-specific keys 106. Where the use case-specific keys 106 correspond to public/private key pairs, the decryption keys 242 may comprise the key pair or to the private key portion of the key pair. The service authorization data 245 includes configuration data that may allow the broker service 218 to determine whether a given service 215 is authorized to access to a particular decryption key 242. It may be the case that a given service 215 may be authorized to access only a subset of the decryption keys 242. Additionally, a given service 215 may be provided with access only at certain times, to accomplish certain tasks, or under certain conditions.

The data stored in the data store 212b includes, for example, entity data 230 and/or other data. The data store 212b may be accessible to one or more of the services 215. While, in one embodiment, entity data 230 may be stored within the service data 227 accessible only to the respective service 215, in another embodiment, the entity data 230 may be stored in the data store 212b such that a single copy of the entity data 230 may be accessible by multiple services 215. For example, multiple services 215 may implement a particular use case, and the data in the entity data 230 may be accessible via the data store 212b to each of the multiple services 215 that implement the particular use case.

Similar to the computing environment 203a, the computing environment 206 may comprise, for example, a server computer or any other system providing computing capability. Alternatively, the computing environment 206 may employ a plurality of computing devices that may be arranged, for example, in one or more server banks or computer banks or other arrangements. Such computing devices may be located in a single installation or may be distributed among many different geographical locations. For example, the computing environment 206 may include a plurality of computing devices that together may comprise a hosted computing resource, a grid computing resource and/or any other distributed computing arrangement. In some cases, the computing environment 206 may correspond to an elastic computing resource where the allotted capacity of processing, network, storage, or other computing-related resources may vary over time.

Various applications and/or other functionality may be executed in the computing environment 206 according to various embodiments. The components executed on the computing environment 206, for example, include one or more services 215N and other applications, services, processes, systems, engines, or functionality not discussed in detail herein. The services 215N may be similar to the services 215a . . . 215M illustrated in the computing environment 203a. For example, the services 215N may include identifier conversion logic 224 that assigns use case-specific entity identifiers 233 to entity data 230. The use case-specific entity identifiers 233 may use the same unified namespace as those for the services 215a . . . 215M. However, the computing environment 206 may be operated by a different organization from the organization operating the computing environment 203a. The broker service 218 may be implemented in a separate computing environment 206 in some embodiments.

Next, a general description of the operation of the various components of the networked environment 200a is provided. To begin, services 215 are configured to receive and/or generate entity data 230 using the business logic 221. The entity data 230 is associated with an actual entity identifier 236 of a customer or other entity. The services 215 are configured to use the identifier conversion logic 224 to replace the association with the actual entity identifier 236 with an association with a use case-specific entity identifier 233. To do this, the identifier conversion logic 224 obtains a use case-specific key 106 and encrypts the actual entity identifier 236. The identifier conversion logic 224 may then perform various processing on the encrypted result, such as, for example, prepending a key or use case identifier, adding an expiration date, adding other metadata, and/or other forms of processing. The use case-specific entity identifier 233 is generated thereby and associated with the entity data 230 pertaining to the customer. Subsequently, the business logic 221 may process, store, transfer, and/or perform other operations on the entity data 230 that is associated with the customer.

In addition, services 215 may obtain entity data 230 associated with use case-specific entity identifiers 233 of other services 215 or use cases. In order to correlate the obtained entity data 230 with the entity data 230 of the present service 215, the identifier conversion logic 224 of the present service 215 may be configured to convert the use case-specific entity identifiers 233 of the other services 215 to new use case-specific entity identifiers 233 of the present service 215 as will be described. It is noted that a service 215N of a computing environment 206 may communicate with the services 215 and the broker service 218 of the computing environment 203a via the network 209 to perform the same or similar functions as the services 215 of the computing environment 203a. In some cases, the computing environments 203a and 206 may share a unified namespace for use case-specific entity identifiers 233 and/or actual entity identifiers 236 to assure uniqueness via resolution of potential collisions among the unique identifiers.

In some embodiments, the use case-specific keys 106 may have a fixed lifespan or may expire. To handle this, the identifier conversion logic 224 may be configured to rotate the use case-specific entity identifiers 233 via decryption using the old use case-specific key 106 and replacement with a new use case-specific key 106. The identifier conversion logic 224 may obtain the new use case-specific key 106 from the broker service 218 and/or provide a new corresponding decryption key 242 to the broker service 218 in various embodiments.

Figure 2B:
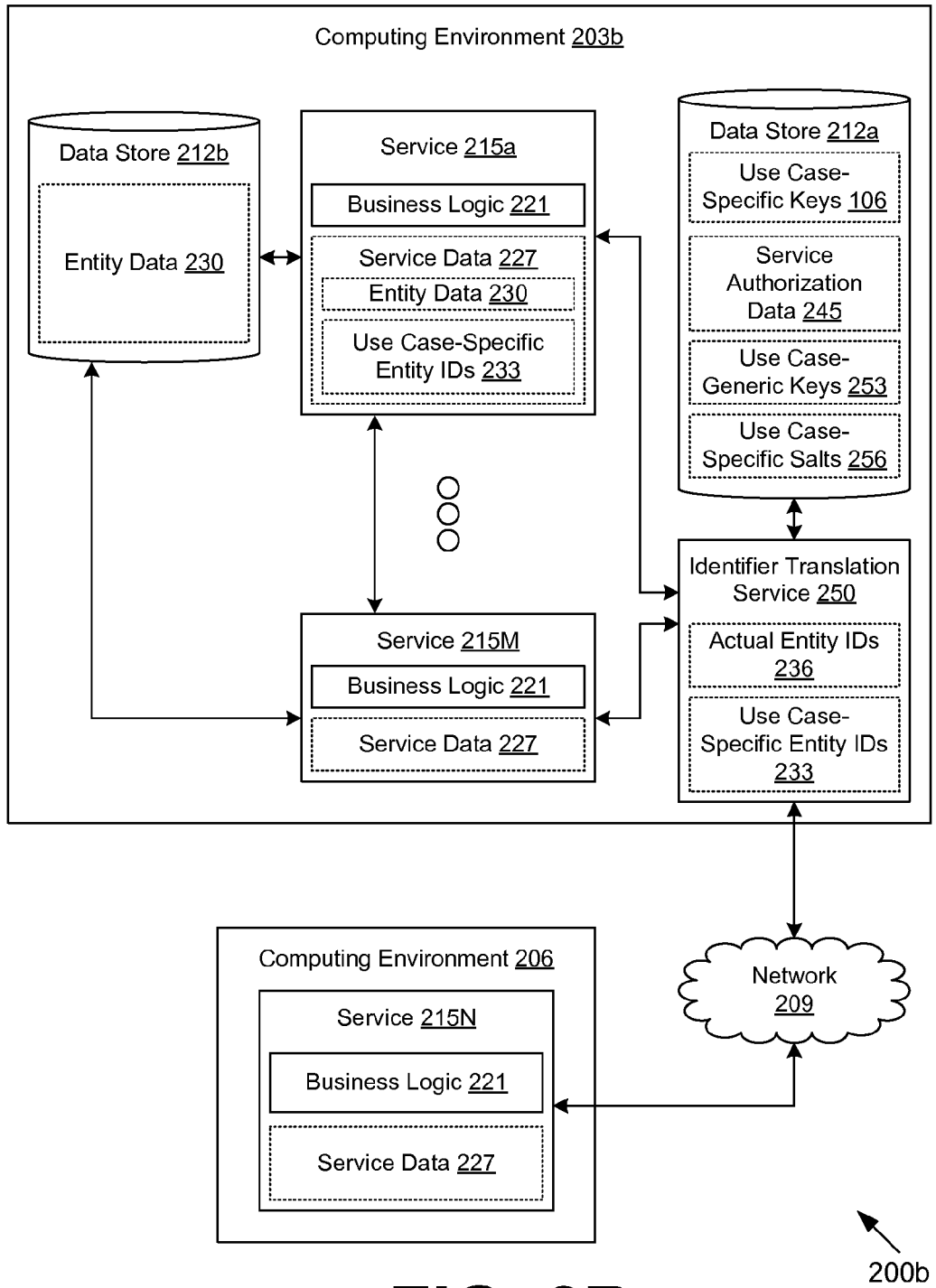
FIG. 2B is a drawing of a networked environment according to various embodiments of the present disclosure that implement centrally managed use case-specific entity identifiers.

With reference to FIG. 2B, shown is a networked environment 200b according to various embodiments. The networked environment 200b includes a computing environment 203b and a computing environment 206, which are in data communication with each other via a network 209. In contrast to the computing environment 203a (FIG. 2A), the computing environment 203b includes an identifier translation service 250 in place of the broker service 218 (FIG. 2A). While in FIG. 2A, the identifier conversion logic 224 (FIG. 2A) of the service 215 performs the identifier conversion, the embodiments of FIG. 2B employ a centralized identifier translation service 250. It is noted that some embodiments may employ the broker service 218 in conjunction with the identifier translation service 250.

The identifier translation service 250 is executed to receive and respond to identifier translation requests from services 215 for conversion of use case-specific entity identifiers 233 from one use case to another. As such, the identifier translation service 250 may perform the key management, authentication, and authorization functions of the broker service 218. By performing the identifier conversion in the identifier translation service 250, the individual services 215 need not be provided with decryption keys and need not have access to the actual entity identifiers 236 (FIG. 2A). The identifier translation service 250 may also function to update expired use case-specific entity identifiers 233 that were encrypted using a key that has expired or will soon expire.

As shown, the actual entity identifiers 236 and the use case-specific entity identifiers 233 may be accessible to the identifier translation service 250. In some cases, the identifier translation service 250 may be configured to cache the translation between use case-specific entity identifiers 233 to provide a faster response. Although one identifier translation service 250 is depicted in FIG. 2B, it is understood that multiple identifier translation services 250 may be employed. For example, one identifier translation service 250 may be utilized by a first set of services 215, and another identifier translation service 250 may be utilized by a second set of services 215.

In one embodiment, the identifier translation service 250 may be configured to function as a transparent proxy. For example, rather than merely translating use case-specific entity identifiers 233, the identifier translation service 250 may be configured to pass a service call from one service 215 to another service 215. In passing the service call onto the other service 215, the identifier translation service 250 may perform the translation of the use case-specific entity identifiers 233. The translation may occur in the opposite direction as well, when the response is returned to the service 215 that originated the service call.

The data store 212a may store the use case-specific keys 106, the service authorization data 245, use case-generic keys 253, use case-specific salts 256, and/or other data. In one embodiment, the identifier translation service 250 may employ use case-specific keys 106 for encryption and decryption, similar to the identifier conversion logic 224. In another embodiment, the identifier translation service 250 may employ use case-generic keys 253 (which may be shared among multiple use cases) in conjunction with use case-specific salts 256. The use case-specific salts 256 may be employed to produce distinct use case-specific entity identifiers 233 for multiple use cases that share a use case-generic key 253. Although the term "salt" is used herein, the use case-specific salts 256 may correspond to randomization values, nonce values, or initialization vectors. The use case-specific keys 106 and/or the use case-generic keys 253 employed by the identifier translation service 250 may be symmetric keys and/or asymmetric key pairs.

In some embodiments, the identifier translation service 250 and/or the identifier conversion logic 224 (FIG. 2A) may be configured to perform the identifier translation/conversion within a trusted computing environment. For example, such a trusted computing environment may be within a secure execution platform, a trusted platform module, or a hardware security module.

Figure 3A:
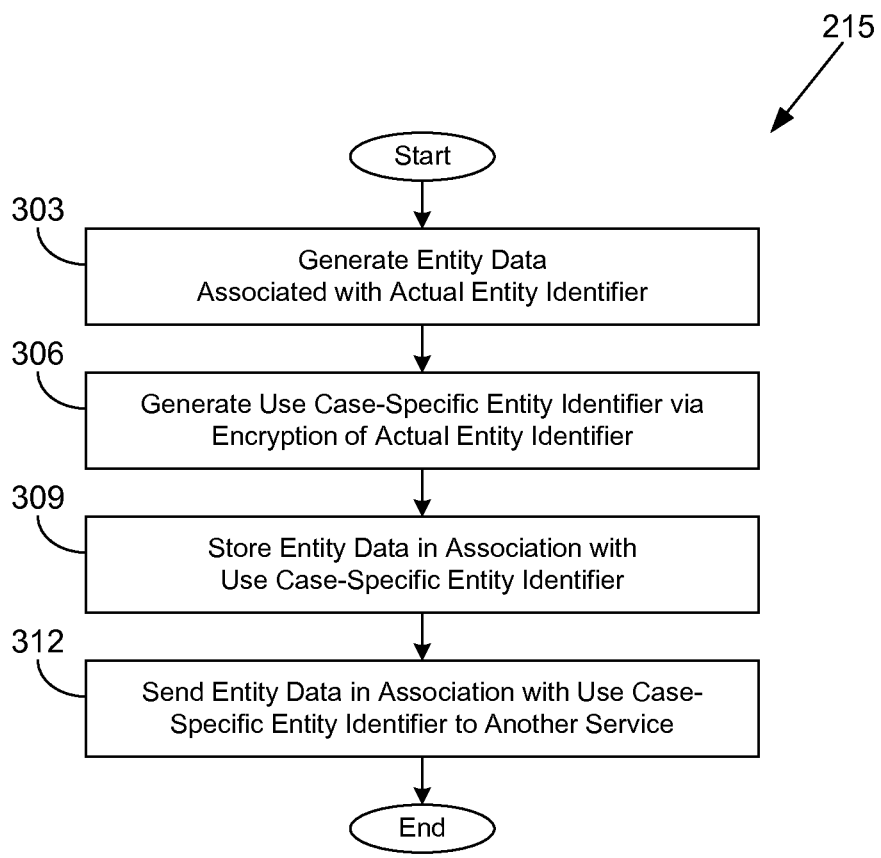
FIGS. 3A-3C are flowcharts illustrating examples of functionality implemented as portions of services executed in a computing environment in the networked environment of FIG. 2A according to various embodiments of the present disclosure.

Referring next to FIG. 3A, shown is a flowchart that provides one example of the operation of a portion of a service 215 according to various embodiments. It is understood that the flowchart of FIG. 3A provides merely an example of the many different types of functional arrangements that may be employed to implement the operation of the portion of the service 215 as described herein. As an alternative, the flowchart of FIG. 3A may be viewed as depicting an example of elements of a method implemented in the computing environment 203a or 206 (FIG. 2A) according to one or more embodiments.

Beginning with box 303, the service 215 generates entity data 230 (FIG. 2A) that is associated with an actual entity identifier 236 (FIG. 2A). In box 306, the service 215 generates a use case-specific entity identifier 233 (FIG. 2A) based at least in part on encryption of the actual entity identifier 236 using reversible encryption. To this end, the service 215 may determine an appropriate use case-specific key 106 (FIG. 2A) and encrypt the use case-specific entity identifier 233 using the use case-specific key 106.

It is noted that, in some embodiments, the service 215 may select from multiple use case-specific keys 106 that are specific to that use case based at least in part on various conditions, e.g., time, actual entity identifier 236, type of entity data 230, and so on. In some embodiments, the service 215 may request the use case-specific key 106 from the broker service 218 (FIG. 2A). The service 215 may thereafter cache the use case-specific key 106 in the service data 227 (FIG. 2A) accessible to the service 215. In some embodiments, the service 215 may generate the use case-specific key 106 and subsequently register the use case-specific key 106 with the broker service 218 such that the broker service 218 is provided with the decryption key 242 (FIG. 2A) for the use case-specific key 106.

In box 309, the service 215 stores the entity data 230 in association with the use case-specific entity identifier 233 that is generated. In various embodiments, the stored entity data 230 may be unassociated with the actual entity identifier 236. In box 312, the service 215 sends at least a portion of the entity data 230 in association with the use case-specific entity identifier 233 to another service 215. Thereafter, the portion of the service 215 ends. It is noted that the flow depicted in FIG. 3A may also be applied to processing bulk entity data 230 pertaining to multiple entities and associated with multiple actual entity identifiers 236.

Figure 3B:
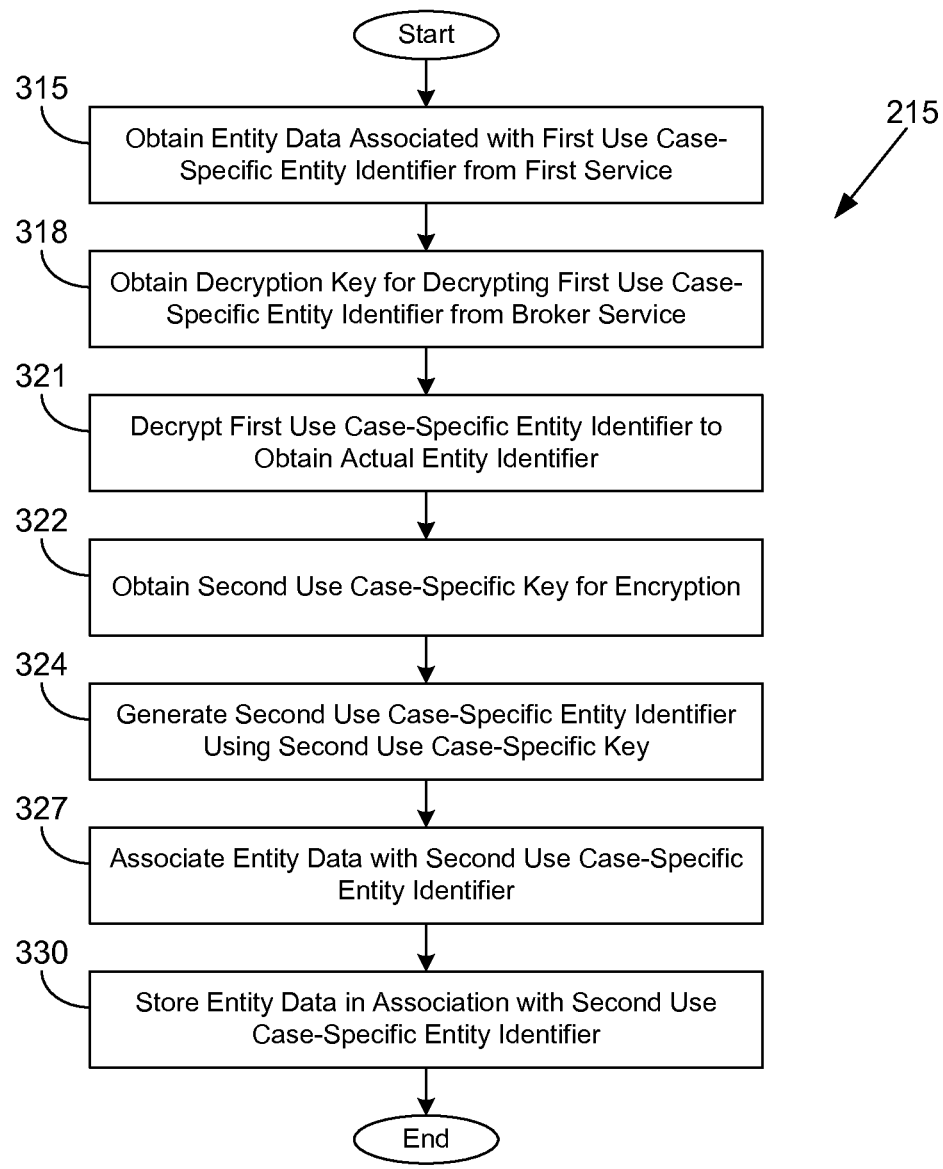

Moving on to FIG. 3B, shown is a flowchart that provides another example of the operation of a portion of a service 215 according to various embodiments. It is understood that the flowchart of FIG. 3B provides merely an example of the many different types of functional arrangements that may be employed to implement the operation of the portion of the service 215 as described herein. As an alternative, the flowchart of FIG. 3B may be viewed as depicting an example of elements of a method implemented in the computing environment 203a or 206 (FIG. 2A) according to one or more embodiments.

Beginning with box 315, the service 215 obtains entity data 230 (FIG. 2A) associated with a first use case-specific entity identifier 233 (FIG. 2A) from a first service 215. In box 318, the service 215 obtains a decryption key 242 (FIG. 2A) for decrypting the first use case-specific entity identifier 233 from the broker service 218 (FIG. 2A). The decryption key 242 may be requested based at least in part on a key or use case identifier in the first use case-specific entity identifier 233. In box 321, the service 215 decrypts the first use case-specific entity identifier 233 to obtain an actual entity identifier 236 (FIG. 2A). In some embodiments, the service 215 may then correlate the entity data 230 with other entity data 230 based at least in part on a comparison of actual entity identifiers 236.

In box 322, the service 215 obtains a second use case-specific key 106 (FIG. 1) for encryption. The second use case-specific key 106 may be stored in the service data 227 (FIG. 2A) or may be requested from the broker service 218. If the second use case-specific key 106 is service-specific, the service 215 may always have its own key. Otherwise, where the use case pertaining to the second use case-specific key 106 is employed by multiple services 215, or if the particular service 215 operates on multiple use cases, the service 215 may be configured to request the second use case-specific key 106 from the broker service 218. For availability and escrow purposes, it may make sense for the second use case-specific key 106 to be generated and/or managed by the broker service 218.

In box 324, the service 215 generates a second use case-specific entity identifier 233 by using a second use case-specific key 106 to encrypt the actual entity identifier 236. In box 327, the service 215 associates the entity data 230 with the second use case-specific entity identifier 233. In some embodiments, the service 215 may then correlate the entity data 230 with other entity data 230 based at least in part on a comparison of second use case-specific entity identifiers 233. Such comparisons may rely on a property of the use case-specific entity identifiers 233 such that a given actual entity identifier 236 will be encrypted into a single unique use case-specific entity identifier 233 for the namespace of the service 215. It is noted, however, that the first use case-specific entity identifier 233 may differ from the second use case-specific entity identifier 233. Further, a given service 215 may have multiple use cases and may maintain multiple namespaces (and corresponding use case-specific keys 106) for use case-specific entity identifiers 233.

In box 330, the service 215 stores the entity data 230 in association with the second use case-specific entity identifier 233. The stored entity data 230 may be unassociated with the first use case-specific entity identifier 233 and/or the actual entity identifier 236. Thereafter, the portion of the service 215 ends. It is noted that the flow depicted in FIG. 3B may also be applied to processing bulk entity data 230 pertaining to multiple entities and associated with multiple actual entity identifiers 236.

Figure 3C:
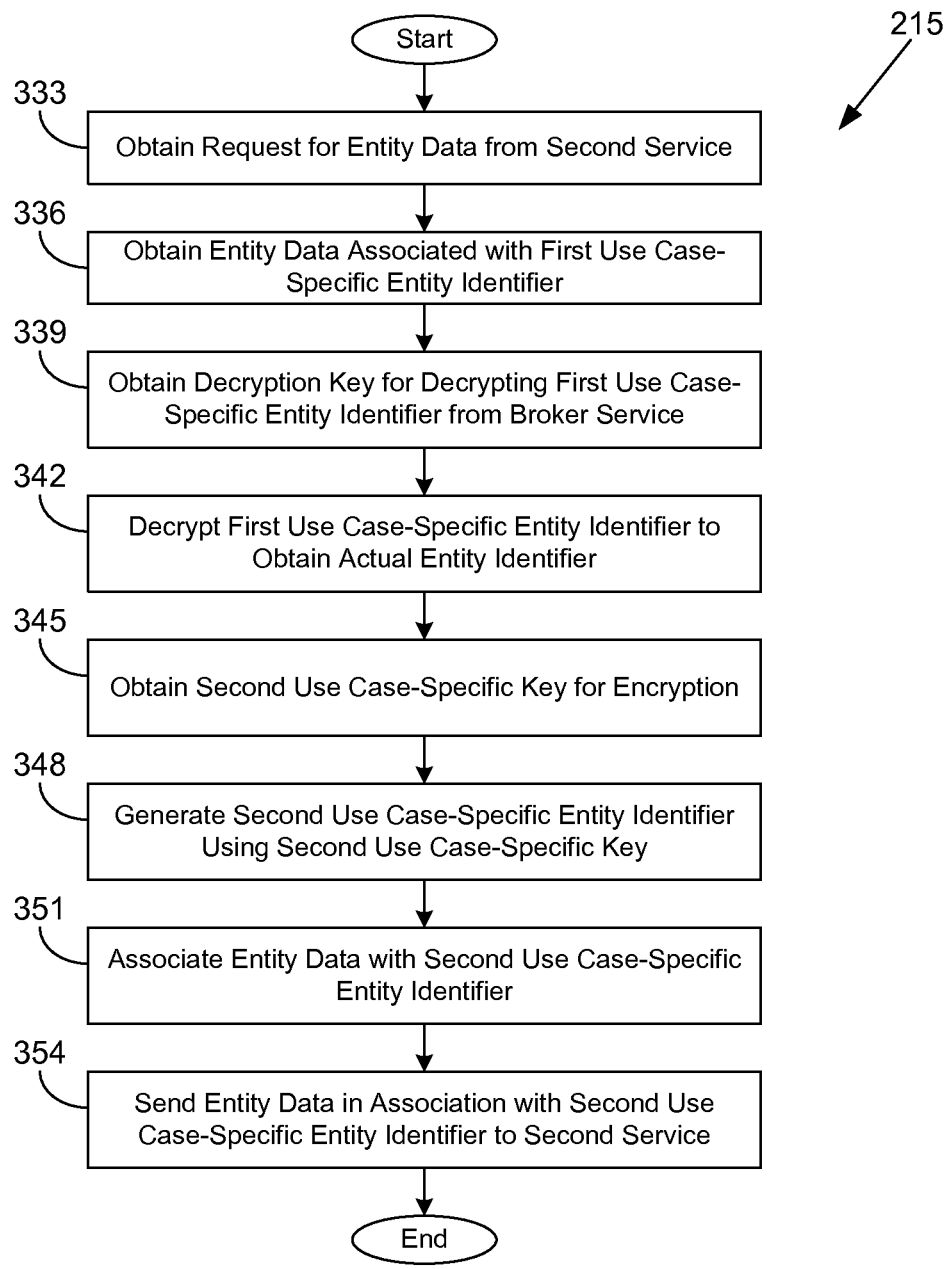

Referring next to FIG. 3C, shown is a flowchart that provides another example of the operation of a portion of a service 215 according to various embodiments. It is understood that the flowchart of FIG. 3C provides merely an example of the many different types of functional arrangements that may be employed to implement the operation of the portion of the service 215 as described herein. As an alternative, the flowchart of FIG. 3C may be viewed as depicting an example of elements of a method implemented in the computing environment 203a or 206 (FIG. 2A) according to one or more embodiments.

Beginning with box 333, the service 215 obtains a request for entity data 230 from a second service 215. In box 336, the service 215 obtains the requested entity data 230 associated with a first use case-specific entity identifier 233 (FIG. 2A) from the service data 227 (FIG. 2A). In box 339, the service 215 obtains a decryption key 242 (FIG. 2A) for decrypting the first use case-specific entity identifier 233 from the broker service 218 (FIG. 2A). The decryption key 242 may be requested based at least in part on a key or entity identifier in the first use case-specific entity identifier 233. In box 342, the service 215 decrypts the first use case-specific entity identifier 233 to obtain an actual entity identifier 236 (FIG. 2A). In some embodiments, the service 215 may then correlate the entity data 230 with other entity data 230 based at least in part on a comparison of actual entity identifiers 236.

In box 345, the service 215 obtains a second use case-specific key 106 (FIG. 1) for encryption. The second use case-specific key 106 may be stored in the service data 227 or may be requested from the broker service 218. In box 348, the service 215 generates a second use case-specific entity identifier 233 by using a second use case-specific key 106 to encrypt the actual entity identifier 236. In box 351, the service 215 associates the entity data 230 with the second use case-specific entity identifier 233. In some embodiments, the service 215 may then correlate the entity data 230 with other entity data 230 based at least in part on a comparison of second use case-specific entity identifiers 233. Such comparisons may rely on a property of the use case-specific entity identifiers 233 such that a given actual entity identifier 236 will be encrypted into a single unique use case-specific entity identifier 233 for the namespace of the use case. It is noted, however, that the first use case-specific entity identifier 233 may differ from the second use case-specific entity identifier 233. Further, a given service 215 may have multiple use cases and may maintain multiple namespaces (and corresponding use case-specific keys 106) for use case-specific entity identifiers 233.

In box 354, the service 215 sends the entity data 230 in association with the second use case-specific entity identifier 233 to the second service 215. Thereafter, the portion of the service 215 ends. It is noted that the flow depicted in FIG. 3C may also be applied to processing bulk entity data 230 pertaining to multiple entities and associated with multiple actual entity identifiers 236.

Figure 4:
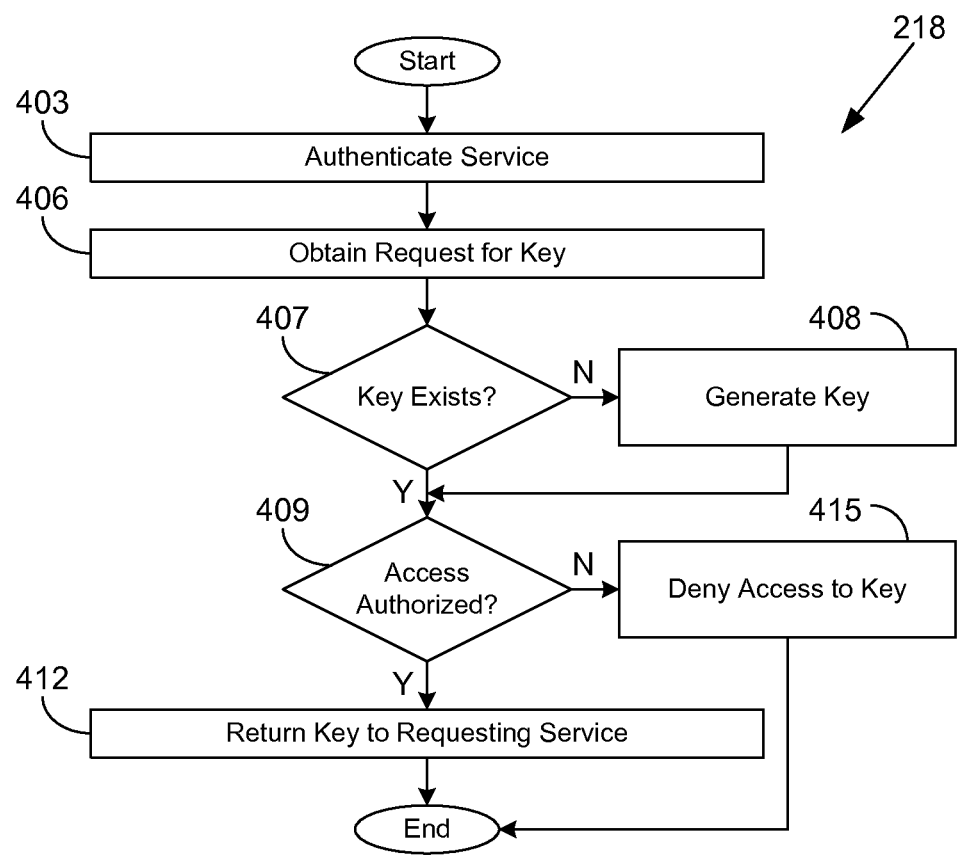
FIG. 4 is a flowchart illustrating one example of functionality implemented as portions of a broker service executed in a computing environment in the networked environment of FIG. 2A according to various embodiments of the present disclosure.

Turning now to FIG. 4, shown is a flowchart that provides one example of the operation of a portion of the broker service 218 according to various embodiments. It is understood that the flowchart of FIG. 4 provides merely an example of the many different types of functional arrangements that may be employed to implement the operation of the portion of the broker service 218 as described herein. As an alternative, the flowchart of FIG. 4 may be viewed as depicting an example of elements of a method implemented in the computing environment 203a (FIG. 2A) according to one or more embodiments.

Beginning with box 403, the broker service 218 authenticates a service 215 (FIG. 2A). In box 406, the broker service 218 obtains a request for a key, such as a use case-specific key 106 (FIG. 2A) or decryption key 242 (FIG. 2A) from the authenticated service 215. The request may present a use case identifier or a key identifier, which may be based at least in part on a use case-specific entity identifier 233 that is to be converted by the service 215.

In box 407, the broker service 218 determines whether the requested key exists. If the requested key does not exist, the broker service 218 moves to box 408 and generates the requested key. The broker service 218 then moves to box 409. If the requested key exists, the broker service 218 moves directly from box 407 to box 409.

In box 409, the broker service 218 determines whether the requesting service 215 is authorized to access the requested key. The broker service 218 may employ the service authorization data 245 (FIG. 2A) to determine whether the access is to be authorized. If the access is to be authorized, the broker service 218 moves from box 409 to box 412 and returns the requested key to the requesting service 215. Thereafter, the portion of the broker service 218 ends. If access is not to be authorized, the broker service 218 instead moves from box 409 to box 415 and denies the requesting service 215 access to the key. Thereafter, the portion of the broker service 218 ends.

Figure 5A:
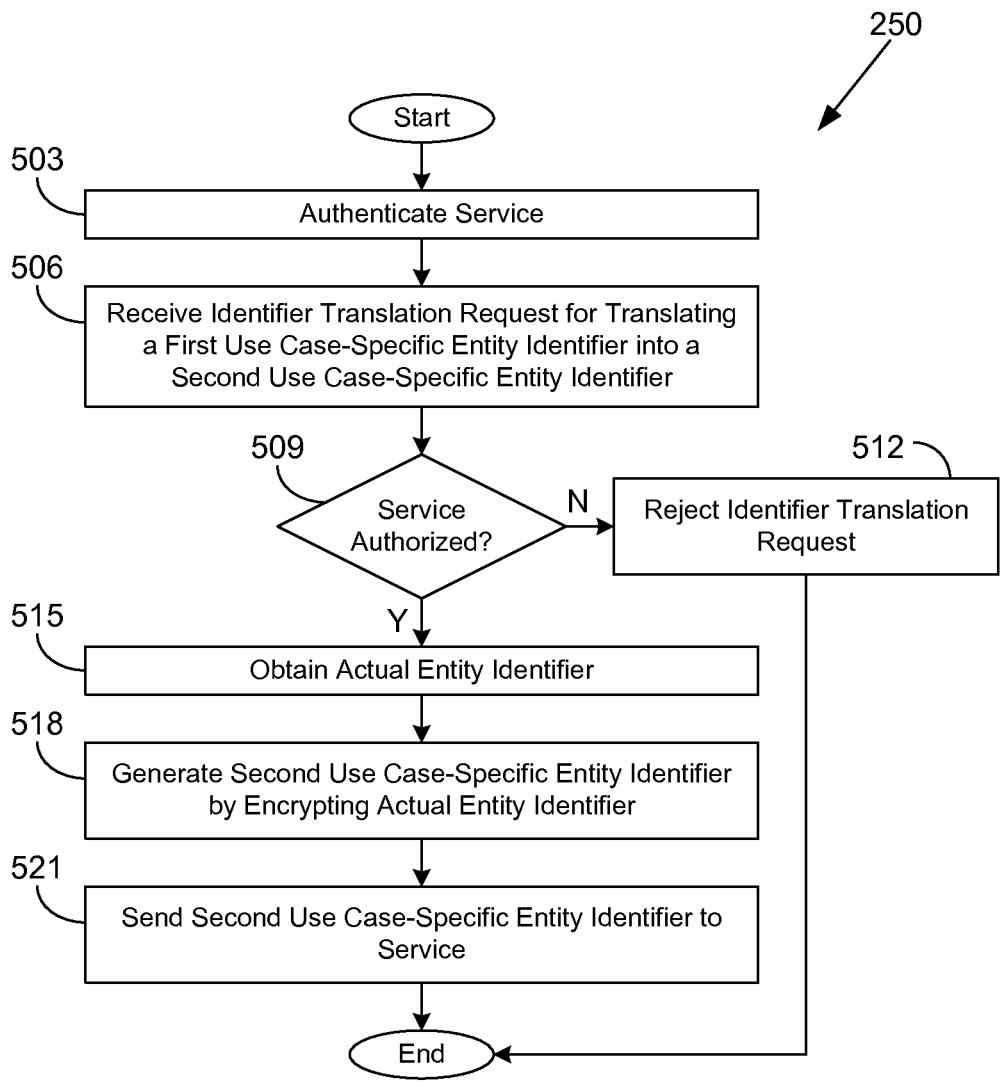
FIGS. 5A and 5B are flowcharts illustrating examples of functionality implemented as portions of an identifier translation service executed in a computing environment in the networked environment of FIG. 2B according to various embodiments of the present disclosure.

Moving on to FIG. 5A, shown is a flowchart that provides one example of the operation of a portion of the identifier translation service 250 according to various embodiments. It is understood that the flowchart of FIG. 5A provides merely an example of the many different types of functional arrangements that may be employed to implement the operation of the portion of the identifier translation service 250 as described herein. As an alternative, the flowchart of FIG. 5A may be viewed as depicting an example of elements of a method implemented in the computing environment 203b (FIG. 2B) according to one or more embodiments.

Beginning with box 503, the identifier translation service 250 authenticates a service 215 (FIG. 2B). In box 506, the identifier translation service 250 receives an identifier translation request from the service 215 for translating a first use case-specific entity identifier 233 (FIG. 2B) into a second use case-specific entity identifier 233. The request specifies the first use case-specific entity identifier 233. In box 509, the identifier translation service 250 determines whether the service 215 has authorization to receive such a translation by consulting the service authorization data 245 (FIG. 2B).

The service authorization data 245 may specify whether a service 215 has access to translate use case-specific entity identifiers 233 from a specific use case and/or to a specific use case. In some situations, a service 215 may be provided with authorization to translate to or from actual entity identifiers 236 (FIG. 2A), and such translation may be implemented in the identifier translation service 250. If the service 215 is determined not to have authorization, the identifier translation service 250 continues to box 512 and rejects the identifier translation request. Thereafter, the portion of the identifier translation service 250 ends.

If the service 215 is determined to have authorization, the identifier translation service 250 continues from box 509 to box 615. In box 615, the identifier translation service 250 obtains an actual entity identifier 236 from the first use case-specific entity identifier 233 specified in the request. To do so, the identifier translation service 250 decrypts the first use case-specific entity identifier 233. In one embodiment, the identifier translation service 250 determines a use case-specific key 106 (FIG. 2B) for a use case associated with the first use case-specific entity identifier 233. The first use case-specific entity identifier 233 may include an identification of the use case to which it pertains, a key and/or salt used to encrypt/decrypt it. There may be a single use case-specific key 106 associated with the use case, or there may be multiple use case-specific keys 106 associated with the use case. The first use case-specific entity identifier 233 may include an identifier of the appropriate use case-specific key 106.

In another embodiment, the identifier translation service 250 determines a use case-generic key 253 (FIG. 2B) that may be shared among multiple use cases and decrypts the first use case-specific entity identifier 233 using the use case-generic key 253. The identifier translation service 250 may then remove a use case-specific salt 256 (FIG. 2B) from the resulting decrypted data in order to obtain the actual entity identifier 236.

In box 518, the identifier translation service 250 generates a second use case-specific entity identifier 233 by encrypting the actual entity identifier 236. In one embodiment, the identifier translation service 250 may employ a use case-specific key 106 that is specific to the particular use case of the second use case-specific entity identifier 233 in order to perform the encryption. In some scenarios, the identifier translation service 250 may select one of several such use case-specific keys 106 specific to the target use case based at least in part on the actual entity identifier 236 and/or other data in order to perform the encryption.

In another embodiment, the identifier translation service 250 may encode the actual entity identifier 236 with a use case-specific salt 256 for the target use case before encrypting the result using a use case-generic key 253. The use case-specific salt 256 may be selected from multiple use case-specific salts 256 associated with the target use case in some scenarios. An identification of the use case, key, or salt may be concatenated to, or otherwise associated with, the resulting encrypted data to produce the second use case-specific entity identifier 233.

In box 521, the identifier translation service 250 sends the second use case-specific entity identifier 233 to the requesting service 215. Thereafter, the portion of the identifier translation service 250 ends. Although the flowchart of FIG. 5A depicts processing of an identifier translation request for a translation of one use case-specific entity identifier 233, it is understood that a single identifier translation request may specify multiple use case-specific entity identifiers 233 to be translated.

Figure 5B:
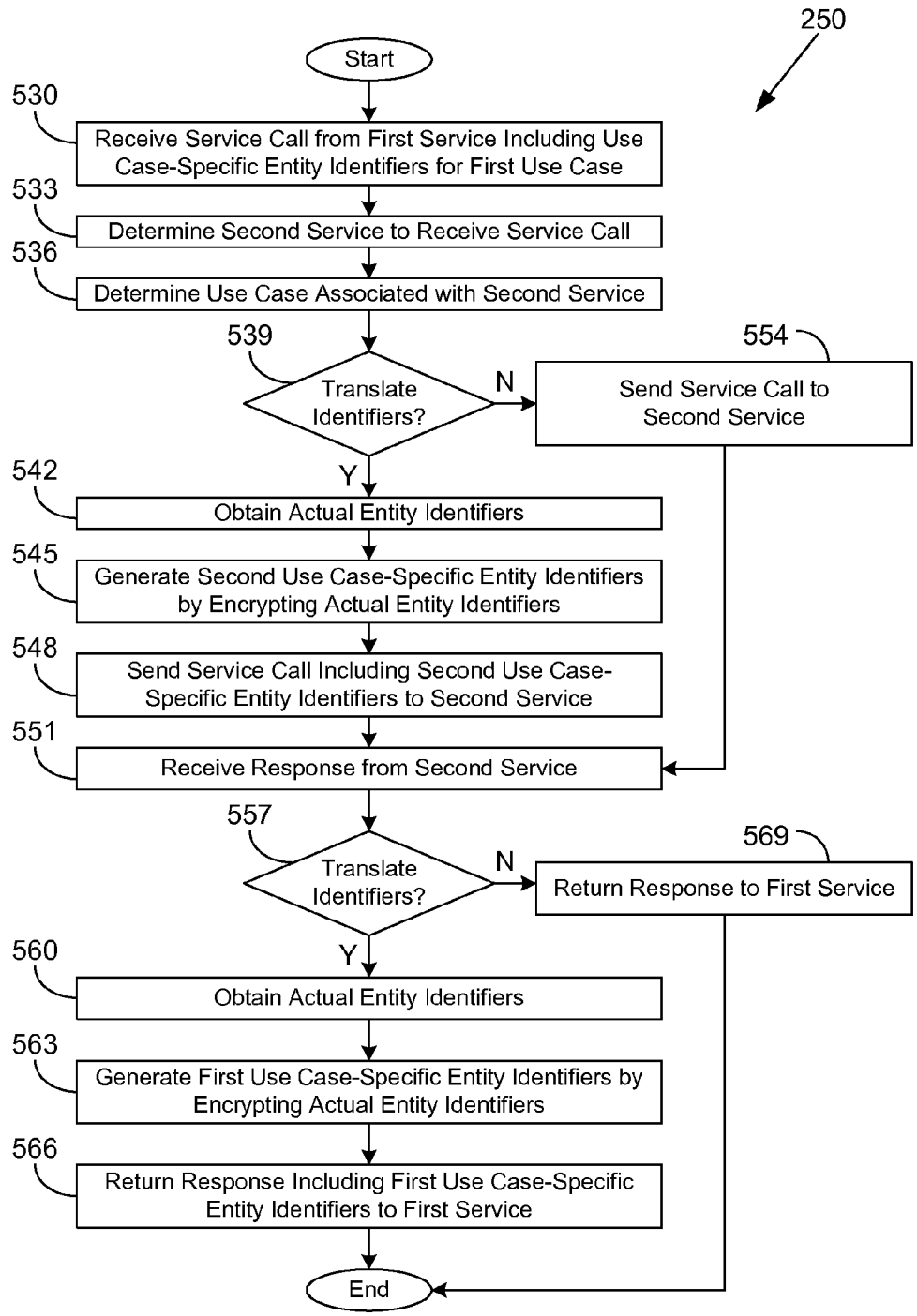

Turning now to FIG. 5B, shown is a flowchart that provides one example of the operation of a portion of the identifier translation service 250 that implements a transparent proxy according to various embodiments. It is understood that the flowchart of FIG. 5B provides merely an example of the many different types of functional arrangements that may be employed to implement the operation of the portion of the identifier translation service 250 as described herein. As an alternative, the flowchart of FIG. 5B may be viewed as depicting an example of elements of a method implemented in the computing environment 203b (FIG. 2B) according to one or more embodiments.

In box 530, the identifier translation service 250 receives a service call from a first service 215 (FIG. 2B). The service call includes use case-specific entity identifiers 233 (FIG. 2B) for a first use case. In box 533, the identifier translation service 250 determines the second service 215 to receive the service call. In box 536, the identifier translation service 250 determines a use case associated with the second service 215 that will employ the data contained in the service call. In box 539, the identifier translation service 250 determines whether the use case-specific entity identifiers 233 are to be translated.

If the use case-specific entity identifiers 233 are to be translated, the identifier translation service 250 obtains the actual entity identifiers 236 (FIG. 2B) in box 542 by decrypting the use case-specific entity identifiers 233. In box 545, the identifier translation service 250 generates second use case-specific entity identifiers 233 by encrypting the actual entity identifiers 236 for the use case associated with the second service 215. In box 548, the identifier translation service 250 sends the service call including the second use case-specific entity identifiers 233 that have been translated to the second service 215. The identifier translation service 250 then continues to box 551.

If use case-specific entity identifiers 233 are not to be translated, the identifier translation service 250 instead moves from box 539 to box 554 and sends the service call to the second service 215 without performing the translation. The identifier translation service 250 then continues to box 551.

In box 551, the identifier translation service 250 receives a response from the second service 215. In box 557, the identifier translation service 250 determines whether the response includes use case-specific entity identifiers 233 that are to be translated. If the response includes use case-specific entity identifiers 233 to be translated, the identifier translation service 250 moves from box 557 to box 560. In box 560, the identifier translation service 250 obtains actual entity identifiers 236 by decrypting use case-specific entity identifiers 233 in the response. In box 563, the identifier translation service 250 generates first use case-specific entity identifiers 233 by encrypting the actual entity identifiers 236. In box 566, the identifier translation service 250 returns the response to the first service 215 that includes the first use case-specific entity identifiers 233 that have been translated. Thereafter, the portion of the identifier translation service 250 ends.

If, instead, the identifier translation service 250 determines that the response does not include use case-specific entity identifiers 233 to be translated, the identifier translation service 250 moves from box 557 to box 569. In box 569, the identifier translation service 250 returns the response to the first service 215. Thereafter, the portion of the identifier translation service 250 ends.

Figure 6:
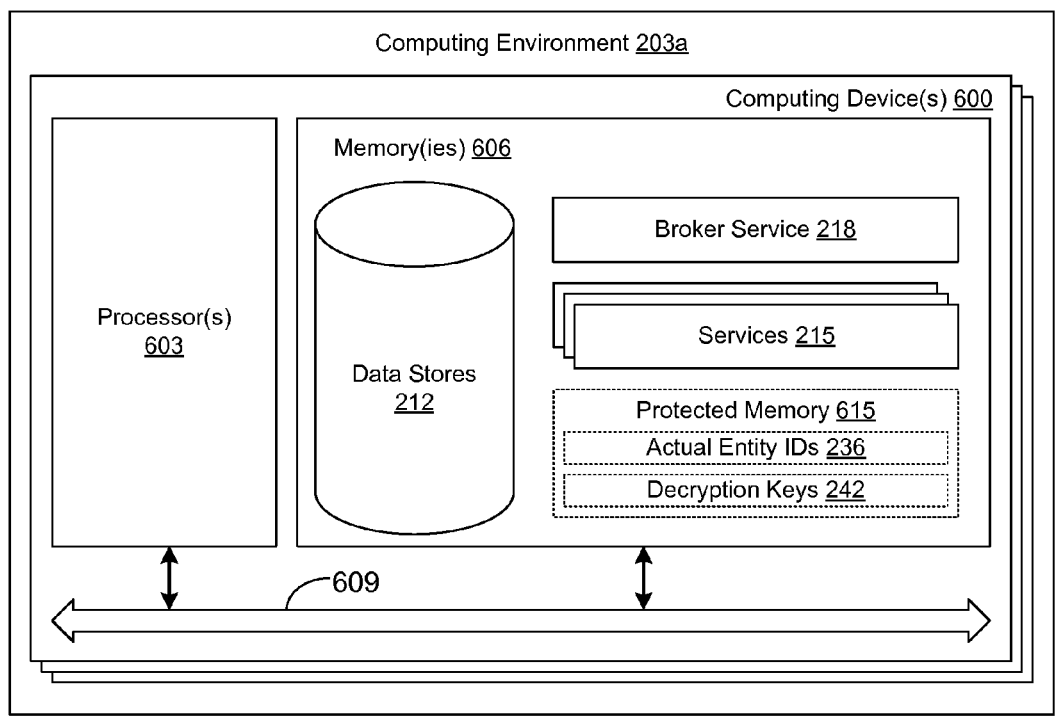
FIG. 6 is a schematic block diagram that provides one example illustration of a computing environment employed in the networked environment of FIG. 2A according to various embodiments of the present disclosure.

With reference to FIG. 6, shown is a schematic block diagram of the computing environment 203a according to an embodiment of the present disclosure. The computing environment 203a includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the services 215, the broker service 218, and potentially other applications. Also stored in the memory 606 may be data stores 212 and other data. In particular, the memory 606 may include one or more regions of protected memory 615 where access is restricted to specific processes and/or services 215. Stored in the protected memory 615 may be the actual entity identifiers 236, the decryption keys 242, and/or other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603.

Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the services 215, the broker service 218, the identifier translation service 250 (FIG. 2B), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3A-5B show the functionality and operation of an implementation of portions of the services 215, the broker service 118, and the identifier translation service 250. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts show a specific order of execution, it is understood that the order of execution may differ from that which is depicted. For example, the order of execution of two or more blocks may be scrambled relative to the order shown. Also, two or more blocks shown in succession in FIGS. 3A-5B may be executed concurrently or with partial concurrence. Further, in some embodiments, one or more of the blocks shown in FIGS. 3A-5B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the services 215, the broker service 218, and the identifier translation service 250, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the services 215, the broker service 218, and the identifier translation service 250, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices in the same computing environment 203*a*. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   receive customer data associated with a plurality of first service-specific customer identifiers corresponding to a plurality of customers;
   request a first key from a broker service, the first key being specific to a first service that generated the plurality of first service-specific customer identifiers;
   determine a plurality of actual customer identifiers by decrypting the plurality of first service-specific customer identifiers using the first key;
   generate a plurality of second service-specific customer identifiers by encrypting individual ones of the plurality of actual customer identifiers using a second key;
   store the customer data in association with the plurality of second service-specific customer identifiers, the customer data being stored unassociated with the plurality of actual customer identifiers and the plurality of first service-specific customer identifiers; and
   wherein the plurality of first service-specific customer identifiers, the plurality of second service-specific customer identifiers, and the plurality of actual customer identifiers are unique identifiers within a shared namespace.

2. A system, comprising:
   at least one computing device;
   a first service executed in the at least one computing device, wherein when executed the first service causes the at least one computing device to at least:
     generate first entity data associated with an actual entity identifier of an entity; and
     send the first entity data in association with a first use case-specific entity identifier to a second service, the first use case-specific entity identifier being specific to a first use case, wherein the first use case-specific entity identifier is generated based at least in part on encrypting the actual entity identifier using reversible encryption and a first use case-specific key; and
   a third service executed in the at least one computing device, wherein when executed the third service causes the at least one computing device to at least:
     generate second entity data associated with the actual entity identifier of the entity; and
     send the second entity data in association with a second use case-specific entity identifier to the second service, the second use case-specific entity identifier being specific to a second use case, wherein the second use case-specific entity identifier is generated based at least in part on encrypting the actual entity identifier using reversible encryption and a second use case-specific key.

3. The system of claim 2, wherein when executed the first service further causes the at least one computing device to at least receive third entity data associated with a third use case-specific entity identifier from a fourth service, the third use case-specific entity identifier being specific to a third use case and the first service.

4. The system of claim 2, wherein the first entity data sent to the second service is unassociated with the actual entity identifier.

5. The system of claim 2, wherein the actual entity identifier is stored in a protected memory of the at least one computing device, the protected memory being accessible only to the first service.

6. The system of claim 2, wherein the first service and the second service are operated by a plurality of organizations employing a unified system of customer identification.

7. The system of claim 2, wherein when executed the first service further causes the at least one computing device to at least:
   select the first use case-specific key from a plurality of keys specific to the first use case; and
   wherein the first use case-specific entity identifier is generated by an encryption of the actual entity identifier using the first use case-specific key that has been selected.

8. The system of claim 2, wherein the first use case-specific key corresponds to a symmetric key specific to the first use case or a public key of an asymmetric key pair specific to the first use case.

9. The system of claim 2, wherein the first use case-specific entity identifier includes an encrypted version of the actual entity identifier, an identifier of a key used to decrypt the encrypted version of the actual entity identifier, and an identifier of the first use case.

10. The system of claim 2, wherein the second service is executed in the at least one computing device, and when executed the second service causes the at least one computing device to at least:
    request the first use case-specific key from a broker service; and
    determine the actual entity identifier associated with the entity data based at least in part on decrypting the first use case-specific entity identifier using the first use case-specific key.

11. The system of claim 10, wherein the broker service is configured to provide the first use case-specific key to the second service in response to determining that the second service is authorized to access the first use case-specific key.

12. The system of claim 10, wherein when executed the second service further causes the at least one computing device to at least:
    receive the second entity data in association with the second use case-specific entity identifier from the third service;
    request the second use case-specific key from the broker service;

determine another actual entity identifier associated with the second entity data based at least in part on decrypting the second use case-specific entity identifier using the second use case-specific key; and correlating the first entity data with the second entity data based at least in part on a comparison between the actual entity identifier and the other actual entity identifier.

13. The system of claim 2, wherein the second use case-specific entity identifier differs from the first use case-specific entity identifier.

14. The system of claim 13, wherein the first use case-specific entity identifier and the second use case-specific entity identifier are in a single namespace of unique identifiers.

15. A method, comprising:

receiving, via at least one of one or more computing devices, entity data associated with a first use case-specific entity identifier;

requesting, via at least one of the one or more computing devices, a first key from a broker service, the first key being specific to a first use case;

determining, via at least one of the one or more computing devices, an actual entity identifier by decrypting the first use case-specific entity identifier using the first key;

generating, via at least one of the one or more computing devices, a second use case-specific entity identifier by encrypting the actual entity identifier using a second key, the second key being specific to a second use case; and associating, via at least one of the one or more computing devices, the entity data with the second use case-specific entity identifier.

16. The method of claim 15, further comprising:

in response to an expiration of the second key:

updating, via at least one of the one or more computing devices, the second use case-specific entity identifier to a third use case-specific entity identifier that is generated by encrypting the actual entity identifier using a third key specific to the second use case.

17. The method of claim 15, further comprising storing, via at least one of the one or more computing devices, the entity data in association with the second use case-specific entity identifier, the stored entity data being unassociated with the actual entity identifier.

18. The method of claim 15, further comprising sending, via at least one of the one or more computing devices, the entity data in association with the second use case-specific entity identifier to a service.

19. The method of claim 15, wherein the requesting further comprises requesting, via at least one of the one or more computing devices, the first key from the broker service based at least in part on a key identifier included in the first use case-specific entity identifier.

20. The method of claim 15, wherein the actual entity identifier is determined and the second use case-specific entity identifier is generated in a hardware security module of the one or more computing devices or a trusted platform module of the one or more computing devices.

* * * * *